United States Patent [19]

Kawahara et al.

[11] Patent Number: 5,371,122
[45] Date of Patent: Dec. 6, 1994

[54] POLYMER COMPOSITE, METHOD AND POLYMER COMPOSITION

[75] Inventors: Masahito Kawahara, Osaka; Koichi Sayo, Kobe; Kazuo Goto, Amagasaki; Toru Noguchi, Kobe; Yoshio Yamaguchi, Kobe; Shigehito Deki, Kobe, all of Japan

[73] Assignee: Mitsuboshi Belting Ltd., Nagata, Japan

[21] Appl. No.: 36,502

[22] Filed: Mar. 24, 1993

[30] Foreign Application Priority Data

Mar. 24, 1992 [JP] Japan ................................ 4-98888

[51] Int. Cl.$^5$ .......................... C08L 77/02; C08K 5/15
[52] U.S. Cl. ........................................ 524/88; 524/89; 524/90
[58] Field of Search ............................ 524/88, 89, 90

[56] References Cited

U.S. PATENT DOCUMENTS 3,565,910 2/1971 Elbert .................................... 524/88
3,969,302 7/1976 Wegmann ........................... 523/333

OTHER PUBLICATIONS

Sen-1 Gakkai Preprints 1991 (F); Oct., 1991; The Society of Fiber Science and Technology, Japan W/English Translation.
Extended Abstracts vol. 92-2; Fall Meeting Oct., 1992; The Electrochemical Society, Inc.

*Primary Examiner*—James J. Seidleck
*Assistant Examiner*—I. Zemel
*Attorney, Agent, or Firm*—Wood, Phillips, VanSanten, Hoffman and Ertel

[57] ABSTRACT

A polymer composite contains colorant molecules dispersed therein. The colorant molecules can be dispersed in the polymer or bound to the polymer molecules. When the polymer is a polyamide, the polyamide is in a noncrystalline state due to the inhibition of crystallization imparted by the size and shape of the colorant molecules because the colorant is separated on a molecular level. A high colorant availability is obtained. A method of producing the polymer composite includes the steps of forming a metastable polymer resin layer, applying a film of colorant to the layer, stabilizing the layer, dissolving the stable layer in a solvent, aspirating the solution to remove impurities and aggregates and then removing the solvent. A polymer composition can be produced by mixing the polymer composite with a polymer.

22 Claims, 4 Drawing Sheets

- ○—○ FRONT VIEW OF TETRAPHENYLPORHYRIN MOLECULE
- ⊕ PLAN OF TETRAPHENYLPORHYRIN MOLECULE
- —— POLYAMIDE MOLECULE

POLYMER COMPOSITE, METHOD AND POLYMER COMPOSITION

TECHNICAL FIELD

The present invention generally relates to a polymer composite that includes a polymer resin having a colorant dispersed therein. In particular, the invention relates to a polymer composite having the colorant dispersed therein on a molecular level. The invention also relates to a method of making the polymer composite. A colored polymer composition can be made by mixing a second polymer and the polymer composite.

BACKGROUND OF THE INVENTION

Conventionally, colored polymeric materials are produced by kneading colorants into the polymer. Alternatively, the colorant and polymer are dissolved in a solvent with the resultant solution being dried to produce the colored polymeric material.

Electrophotographic photoreceptors, heat mode memories and the like can include as components porphyrin or phthalocyanine as the colorant, polycarbonates, polymethyl methacrylate or polyphenylene oxide as the polymer and dichloromethane as the solvent. The components are used in a spin coating method with the solution being dried to form a film.

Unfortunately, films obtained by kneading, dissolving or spin casting have shortcomings such as uneven coloring, poor colorant availability and, for electrophotographic receptors, heat mode memories and the like, poor resolving power and resolution as a result of colorant aggregation.

A colored polymeric material that avoids the aforementioned shortcomings is highly desirable.

SUMMARY OF THE INVENTION

The present invention is directed to a polymer composite that can be used as a dye, coloring agent or chemical indicator polymer. The polymer composite includes a polymer resin and at least one colorant capable of being dispersed in the matrix of the polymer resin or bonding to the polymer resin.

The polymer composite can be produced by forming a thermodynamically metastable polymer resin layer having a surface, depositing a film of the colorant on the surface and relaxing the layer having the film thereon until it reaches a stable state. Relaxing the metastable layer results in the colorant migrating into the polymer layer to disperse the colorant in the polymer layer. Then, the relaxed layer is exposed to a solvent to separate out aggregates and impurities and the solvent is removed to produce the polymer composite.

The metastable layer can be produced by vapor (vacuum) deposition, by melting a polymer resin and rapidly solidifying it or by dissolving the polymer resin and then applying a reduced pressure to the solution to rapidly remove the solvent.

The polymer composite can then be used as a coloring agent for a second polymer that is the same as or different from the polymer resin.

The polymer composite has the colorant uniformly and evenly dispersed therein on the molecular level, i.e., the colorant is not aggregated in the polymer, although clusters containing one to several colorant molecules can be present. Thus, the problems associated with uneven coloring, poor colorant availability, poor resolving power and resolution and colorant aggregation are avoided.

Numerous other advantages and features of the present invention will become readily apparent from the following figures, detailed description of the preferred embodiments and the appended claims.

DETAILED DESCRIPTION OF THE PREFERRED EMBODIMENTS

Figure 1:
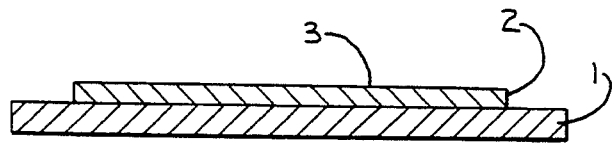
FIG. 1 is a longitudinal cross-sectional view showing a polymer resin layer on a substrate that is used in a process to make the polymer composite of the present invention.
Figure 2:
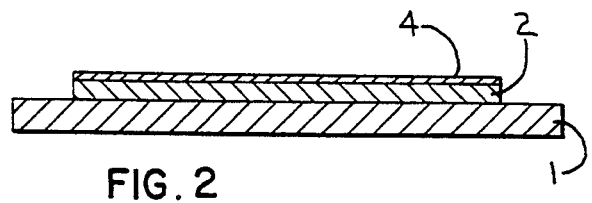
FIG. 2 is a longitudinal cross-sectional view showing a colorant film on the polymer resin layer that is used in a process to make the polymer composite of the present invention.
Figure 3:
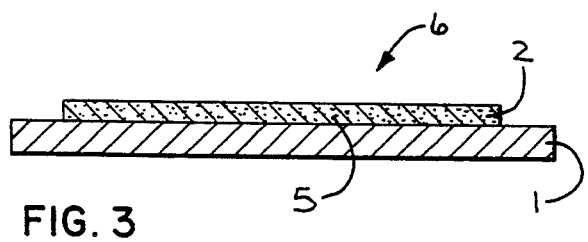
FIG. 3 is a longitudinal cross-sectional view showing the polymer layer containing colorant that is used in a process to make the polymer composite of the present invention.

Although this invention is susceptible to embodiment in many different forms, there are shown in the drawings and described in detail herein, presently preferred embodiments of the invention. It should be understood, however, that the present disclosure is to be considered as an exemplification of the principles of this invention and is not intended to limit the invention to the embodiments illustrated.

A polymer composite includes a polymer resin and a colorant that is capable of being separately dispersed in the polymer resin. That is, the colorant is dispersed on a molecular level without aggregates.

The polymer resin can be a polycarbonate, polystyrene, polymethyl methacrylate, polyester, polyamide and the like. The polymer resin preferably has a cohesive energy density of greater than about 2,000 cal/mol. Most preferably, the cohesive energy density is in the range of about 2,000 to about 6,000 cal/mol. Preferably, the polymer resin is transparent. The polymer resin can be crystalline or noncrystalline.

The term "cohesive energy density", as used in its various grammatical forms, is defined in *Kagaku Binran Oyo-hen,* Chemical Society of Japan, p890 (1974) as follows:

COHESIVE ENERGY DENSITY (iv) Cohesive energy density

Plastics in general are not crystalline polymers as suggested by the fact that they were called synthetic resins because of their resemblance to pine resin when they appeared for the first time. However, not all plastics are amorphous; many of them are partly crystalline. Polymeric substances may be arranged in the order of their cohesive energy density. Those having a low value are elastomers, those having a medium value are plastics, and those having a high value are fibers (see Table 11.71). With a higher cohesive energy density, plastics crystallize more readily, show an increase in melting point, and exhibit the properties of fibers. Rubbery substances have a low cohesive energy density and their melting point is usually lower than the working temperature.

In classifying polymeric substances into rubbers, plastics, and fibers, one draws on their properties which vary depending on temperature. They may be classified as follows according to their working temperature.

Rubbers working temperature < softening point (three-dimensional structure) > $T_g$ Flexible plastics softening point > working temperature > $T_g$ Rigid Plastics $T_m > T_g >$ working temperature Fibers $T_m >$ working temperature Having $T_g$ higher than room temperature, rigid plastics are frozen and solid at room temperature. At temperatures above $T_m$, they become fluid and exhibit plasticity and hence they are capable of molding. When solidified, they exhibit the properties of plastics owing to increased cohesive energy and restrained molecular motion. They become fibers if they undergo stretching which orients molecules. Fibers have a greater cohesive energy density and intermolecular force than plastics.

As mentioned above, the properties of plastics may be distinguished by the glass transition point ($T_g$) and the melting point ($T_m$). In generally, $T_m$ is related by heat of fusion ($\Delta H_m$) and entropy of fusion ($\Delta S_m$) as follows:

$$T_m = \Delta H_m / \Delta S_m$$

$\Delta H_m$ is the difference between the internal energies of crystalline and amorphous fractions. It is expressed in terms of cohesive energy due to intermolecular force. $\Delta S_m$ is the difference between the entropies of crystalline molecules and amorphous molecules. If it is desirable to have a low $T_m$ (as in the case of rubber), the object is achieved by lowering $\Delta H_m$ or increasing $\Delta S_m$.

The fact that polyethylene exhibits high plasticity despite its small cohesive energy is presumably due to its symmetric molecular structure and its strong tendency toward crystallization which leads to a small $\Delta S_m$. Cohesive energies are shown in Table 11.72.

TABLE 11.71

Cohesive Energy Density of Polymer Material

| Material | Main Chain | Atomic Group Pulling against each other | Cohesive Energy Density Calculated per coordination number 4 and chain length 5 Å (cal mol$^{-1}$) | |
|---|---|---|---|---|
| polyethylene | —C—C— | (CH$_2$) | 1.000 | |
| polyisobutylene | —C—C— | (CH$_2$)(CH$_3$) | 1.200 | rubber material |
| polybutadiene | —C=C— | (CH$_2$)(CH=CH) | 1.100 | |
| rubber | —C=C— | (CH$_2$)(CH=CCH$_3$) | 1.300 | |
| polystyrene | —C—C— | (CH$_2$)(C$_3$H$_5$) | 4.000 | |
| polychloroprene | —C—C— | (CH$_2$)(CH=CHCl) | 1.600 | |
| polyvinylchloride | —C—C— | (CH$_2$)(CHCl) | 2.800 | plastic |
| polyvinylacetate | —C—C— | (CH$_2$)(OCOCH$_3$) | 3.200 | |
| polyvinylalcohol | —C—C— | (CH$_2$)(CHCH) | 4.200 | |
| cellulose | —C—O—C— | (OH)(—O—) | 6.200 | |
| cellulose acetate | —C—O—C— | (OH$_2$)(—O—) | 4.800 | fiber |
| polyamide | —C—N—C— | (CH$_2$)(CONH) | 5.800 | |
| silk fibroin | —C—N—C— | (CHR)(CONH) | 9.800 | |

A representative polycarbonate is a Bisphenol-A type polycarbonate.

A representative polyester is polyethylene terephthalate.

The polyamide is a high molecular weight polymer having an amide linkage and carbonyl groups and is soluble.

Representative polyamide resins include nylon 6, nylon 6,6, nylon 11, nylon 12, nylon 6,9 and the like.

The colorant is capable of being dispersed in the polymer resin. Aggregates of the colorant are not present in the polymer composite although clusters of one to several molecules can be present.

Representative colorants are azobenzene, 4-phenylazobenzene, 4-dimethylaminoazobenzene, 4-dimethylamino-4'-methylazobenzene, 4-nitro-4'-dimethylaminoazobenzene, 1-phenylazonaphthalene, 4-phenylazoazobenzene, (naphthylazo)-1,1'-azonaphthalene, trisazobenzene, stilbene, 4-dimethylamino-4'-nitrostilbene, coumarin, 4-methyl-7-dimethylaminocoumarin, 3,3'-diethyldicarbocyanine iodide, 3,3'-methyloxatricarbocyanine iodide, 3-ethyl-5-[4-(3-ethyl-2-benzothiazolylidene)-2-hexenylidene]rhodanine, squarilium, spiropyran, fulgide, indigo, anthracene, perylene and 1,4-benzoquinone.

The colorant used with the polyamide resin is capable of bonding to the polyamide resin. Preferably, the colorant has at least one N—H group or one metal group that is capable of bonding to the carbonyl group of the polyamide resin via a hydrogen or coordinate bond, respectively. The colorant can inhibit crystallization of the polyamide resin so that the polyamide resin remains in a noncrystalline state. A high colorant availability is insured because the colorant is separately dispersed on a monomolecular level.

Representative colorants, especially for use with the polyamide resin, are porphyrin derivatives, metallo-porphyrin derivatives, phthalocyanine derivatives, metallo-phthalocyanine derivatives, naphthalocyanine derivatives, metallo-naphthalocyanine derivatives, and the like.

The porphyrin derivative preferably has the following FORMULA I:

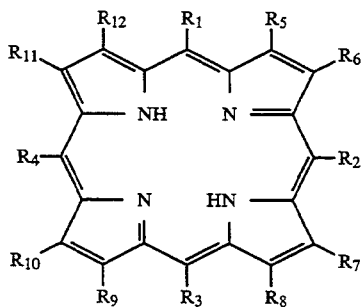

FORMULA I wherein R1, R2, R3 and R4 are alike or different and can be hydrogen, an alkyl group, an alkoxy group, an amino group, a cyano group, a phenyl group, a benzo group or a pyridyl group and R5 to R12 are alike or different and can be hydrogen, an alkyl group, an alkoxy group, an amino group or a cyano group.

The metallo-porphyrin derivative preferably has the following FORMULA II:

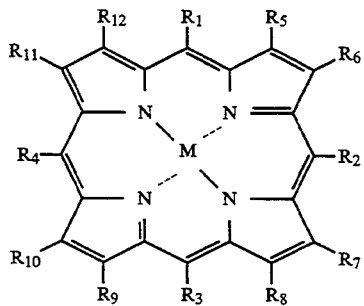

FORMULA II wherein R1 to R12 are as described above in connection with FORMULA I and M represents a transition meal, an alkali metal, an alkaline earth metal, an element belonging to the Group IIIA or IVA of the second or lower period or a metal belonging to Group VA or VIA of the Periodic Table.

The phthalocyanine derivative preferably has the following FORMULA III:

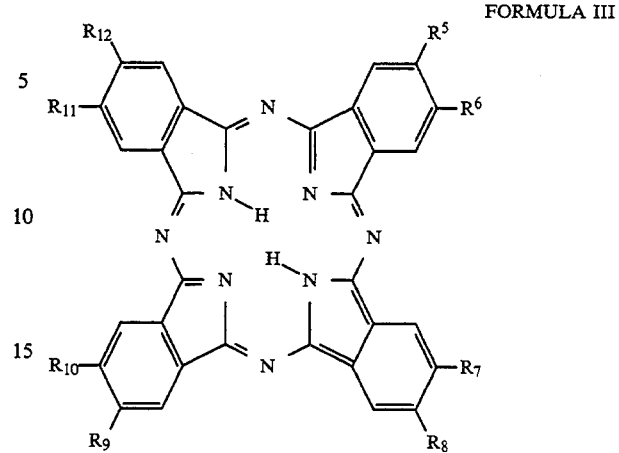

FORMULA III wherein R5 to R12 are as described above in connection with FORMULA I.

The metallo-phthalocyanine derivative preferably has the following FORMULA IV:

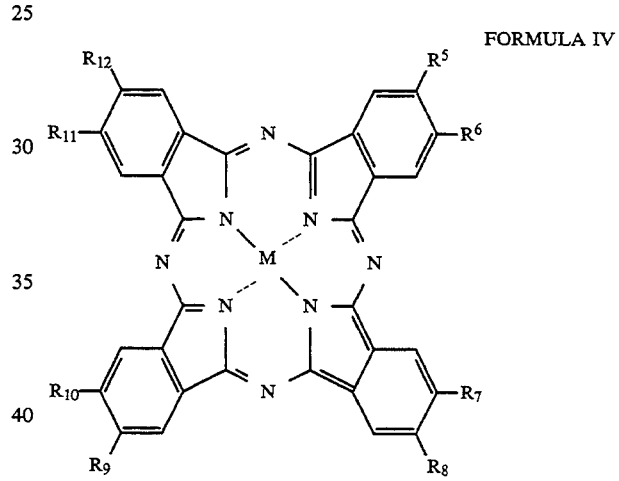

FORMULA IV wherein R5 to R12 are as described above in connection with FORMULA I and M is as described in connection with FORMULA II.

The naphthalocyanine derivative preferably the following FORMULA V:

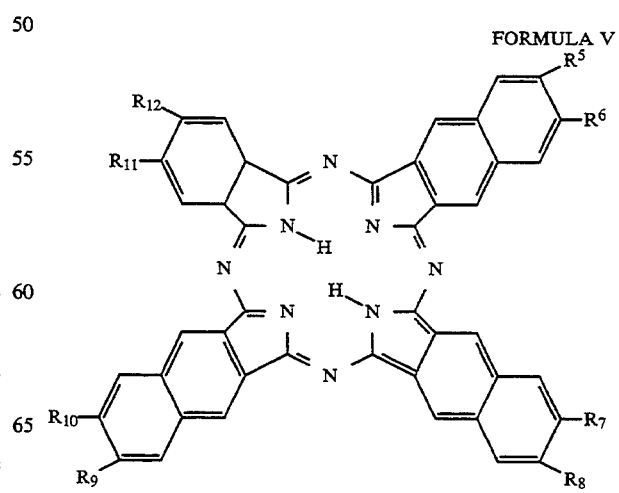

FORMULA V wherein R5 to R12 as described above in connection with FORMULA I.

The metallo-naphthalocyanine preferably has the following FORMULA VI:

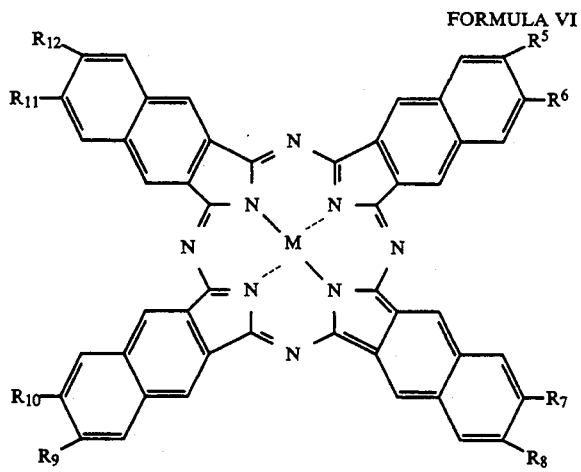

FORMULA VI wherein R5 to R12 are as described above in connection with FORMULA I and M is as described above in connection with FORMULA II.

Specific colorants having the above-described formulas are molecular crystals of porphyrin, tetraphenylporphyrin, tetrabenzoporphyrin, tetrapyridylporphyrin,2,3,7,8,12,13,17,18-octaethylporphyrin,magnesiumporphyrin, vanadyl porphyrin, cobalt porphyrin, zinc porphyrin, magnesium-5,10,15,20-tetraphenylporphyrin, cobalt-5,10,15,20-tetraphenylporphyrin (cobalt tetraphenylporphyrin), vanadyl-5,10,15,20-tetraphenylporphyrin (vanadyl tetraphenylporphyrin), nickel-5,10,15,20-tetraphenylporphyrin, lead-5,10,15,20-tetraphenylporphyrin, magnesium-5,10,15,20-tetrapyridylporphyrin, vanadyl-5,10,15,20-tetrapyridylporphyrin, zinc-5,10,15,20-tetrapyridylporphyrin, cobalt-5,10,15,20-tetrapyridylporphyrin, phthalocyanine, octacyanophthalocyanine, tetra-t-butylphthalocyanine, magnesium phthalocyanine, vanadylphthalocyanine, copper phthalocyanine, zinc phthalocyanine, aluminum phthalocyanine, silicon phthalocyanine, copper tetra-t-butylphthalocyanine, copper octacyanophthalocyanine, naphthalocyanine, copper naphthalocyanine, zinc naphthalocyanine, cobalt naphthalocyanine, vanadylnaphthalocyanine, octacyanonaphthalocyanine, tetracyanonaphthalocyanine, tetramethylnaphthalocyanine, tetraethylnaphthalocyanine and tetramethoxynaphthalocyanine.

The production of the polymer composite is illustrated in FIGS. 1 to 4. First, a thermodynamically metastable polymer resin layer 2 is formed. The metastable layer 2 can be formed on a substrate 1 and has a surface 3. A film 4 of colorant is applied to the surface 3. Then, the polymer resin layer 2 having the film 4 is relaxed at an elevated or room temperature to a stable state. Relaxation causes the film 4 to disperse and the colorant molecules 5 to migrate into the polymer resin layer 2 to produce polymer composite precursor 6 that is a solid solution of the colorant in the polymer resin.

Figure 4:
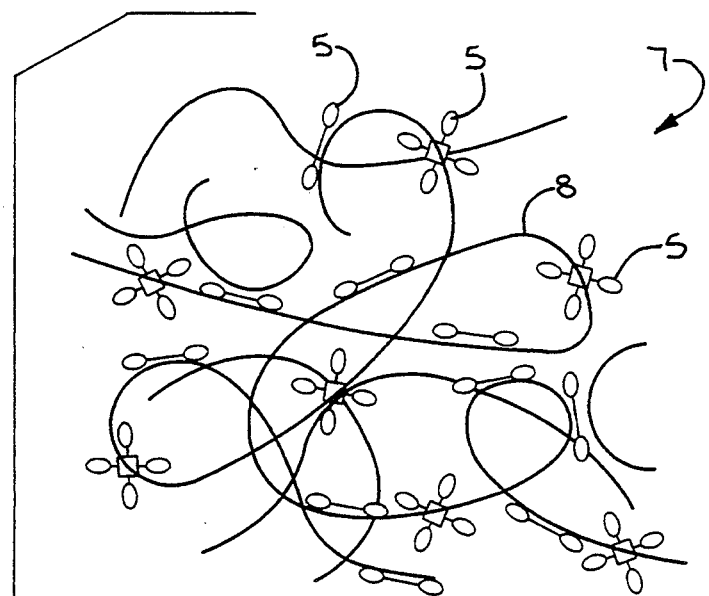
FIG. 4 is a schematic representation of the molecular structure of the polymer composite of the present invention.

The polymer composite precursor is removed from the substrate and dissolved in a solvent (not shown). The resultant solution is placed in an aspirating filtering apparatus having a glass filter, aspirated and then filtered. The aspirating filtering apparatus removes impurities, e.g., colorant aggregates, colorant crystals and polymer aggregates. The filtrate is then dried to produce the pure solid polymer composite (not illustrated). In the case of the polyamide composite 7 obtained using polyamide resin and tetraphenylporphyrin, the structure is schematically shown in FIG. 4.

Preferably, the glass filter has a pore size of less than about 1 micron. Aggregates that are larger than the pore size would be removed.

Alternatively, the polymer composite precursor is added into a solvent and then a pure polymer composite is centrifugally separated as a precipitate to remove poorly dispersed colorant aggregates and other impurities. The precipitate is then dried to produce the solid polymer composite. This alternative is not illustrated.

The polymer composite precursor can be repeatedly immersed in a solvent for a time period effective to remove poorly dispersed colorant aggregates and other impurities without dissolving the precursor. The purified precursor is then dried to produce the solid polymer composite. This alternative is not illustrated.

When using the centrifugation or repetitive immersion method, the solvent is one in which the polymer composite cannot be dissolved yet preferably selectively dissolves poorly dispersed colorant aggregates. Representative solvents include hexane, carbon tetrachloride, toluene, benzene, chloroform and the like.

When using the aspirating filtering apparatus, the solvent in which the polymer composite precursor is dissolved can be m-cresol, 1,2-dichloroethane, diphenyl ether, tetrahydrofuran and the like.

The polymer composite is a dispersion wherein each individual molecule of colorant is either dispersed in the matrix of the polymer resin or, as is the case with the polyamide composite, bound to a carbonyl group of the polymer molecule. The polymer molecule having individual molecules of colorant bound thereto is in a noncrystalline state due to inhibition of crystallization by the shape and size of the colorant molecules.

The polymer composite has high light transmission and exhibits no anisotrophy.

The polymer composite contains about 70 to about 99.9 weight percent (wt %) polymer resin and about 0.1 to about 30 wt % colorant.

The metastable polymer resin layer 2 can be produced by a vacuum deposition method, a melting followed by rapid solidification method or a dissolving followed by rapid solvent removal method. In the vacuum deposition method, the polymer resin is placed in a conventional vacuum deposition apparatus that is conventionally operated. The resin layer 2 can be formed on a substrate of glass or ceramic material in a vacuum of $10^{-4}$ to $10^{-6}$ Torr at a depositing speed of 0.1 to 100, preferably 0.5 to 5, microns per minute. With vacuum deposition, the molecular weight of the polymer resin of the metastable layer can be reduced to about ½ to about 1/10th that of the starting polymer resin. In the melting and rapid solidification method, the polymer resin is melted and then rapidly cooled at a rate exceeding the critical cooling rate of the polymer resin. Cooling can be effected by introducing the melted polymer resin into liquid nitrogen. In the dissolving followed by rapid solvent removal method, the polymer resin is dissolved in a solvent, the resulting solution is coated on a substrate and then the solution is subjected to a reduced pressure to rapidly remove the solvent.

The solvent used to prepare the metastable layer can be a solvent used to treat the polymer composite precursor.

The colorant film can be produced using the above described vacuum deposition method including the depositions conditions.

The colorant, especially tetraphenylporphyrin, and polymer resin, especially polyamide resin, can be used in amounts to produce a colorless and transparent polymer composite that changes its color upon exposure to solvent vapor. When the solvent vapor is removed the polymer composite again becomes colorless and transparent. This polymer composite is useful as a chemical indicator polymer.

A colored polymer composition containing the polymer composite can be prepared by introducing the polymer composite and a second polymer to a solvent to produce a solution. The solution can then be applied to a substrate such as a glass plate which is then placed in a degassing chamber. The solvent is removed under reduced pressure that can be created by a rotary pump to produce the composition. The composition can be a sheet-form composition.

The polymer of the polymer composition can be the same as or different from the polymer resin of the polymer composite. Representative polymers include polycarbonates, polystyrenes, polymethyl methacrylates, polyesters, polyamides and the like.

The amount of polymer composite and polymer utilized can be varied to yield the desired wt % colorant in the polymer composition.

The color tone, uneven coloring and colorant matter size of the composition, especially sheet-form composition, can then be observed using an optical microscope or a scanning electron microscope.

The following examples are given by way of illustration and not limitation.

EXAMPLE 1

Polyamide Composites and Compositions Containing 0.5 Wt % Colorant Made Therefrom A polyamide resin layer in a metastable state was produced by a vapor deposition method. After placing nylon 11 pellets on a tungsten board inside a vacuum deposition apparatus and reducing the pressure to $10^{-4}$ to $10^{-6}$ Torr, the tungsten board was heated by a voltage between the electrodes to melt the nylon and produce a metastable polyamide resin layer having a thickness of about 5 microns that was deposited at a rate of about 1 micron per minute to a glass plate above the attachment table. The molecular weight of the polyamide resin of the layer was about ½ to about 1/10th that of the nylon of the pellets. Four polyamide resin layers were prepared using this method.

The polyamide resin layers were then coated with cobalt tetraphenylporphyrin, vanadyltetraphenylporphyrin, copper phthalocyanine or tetrabenzoporphyrin by placing the respective colorant on the tungsten board, heating the board and evaporating the colorant at a reduced pressure of $10^{-4}$ to $10^{-6}$ Torr to deposit a film of the colorant on the polyamide resin layer.

The colorant film coated polyamide resin layers were removed from the vacuum deposition apparatus and maintained in an oven at a temperature of 120° C. for a time period of ten minutes to produce polyamide composite precursors.

The polyamide composite precursors were dissolved in m-cresol. An aspiration filtering apparatus was used to remove aggregates and impurities from the solutions. The solutions were aspirated within sixty minutes. The solutions were then dried. Each polyamide composite contained about 5 wt % of the colorant.

Figure 5:
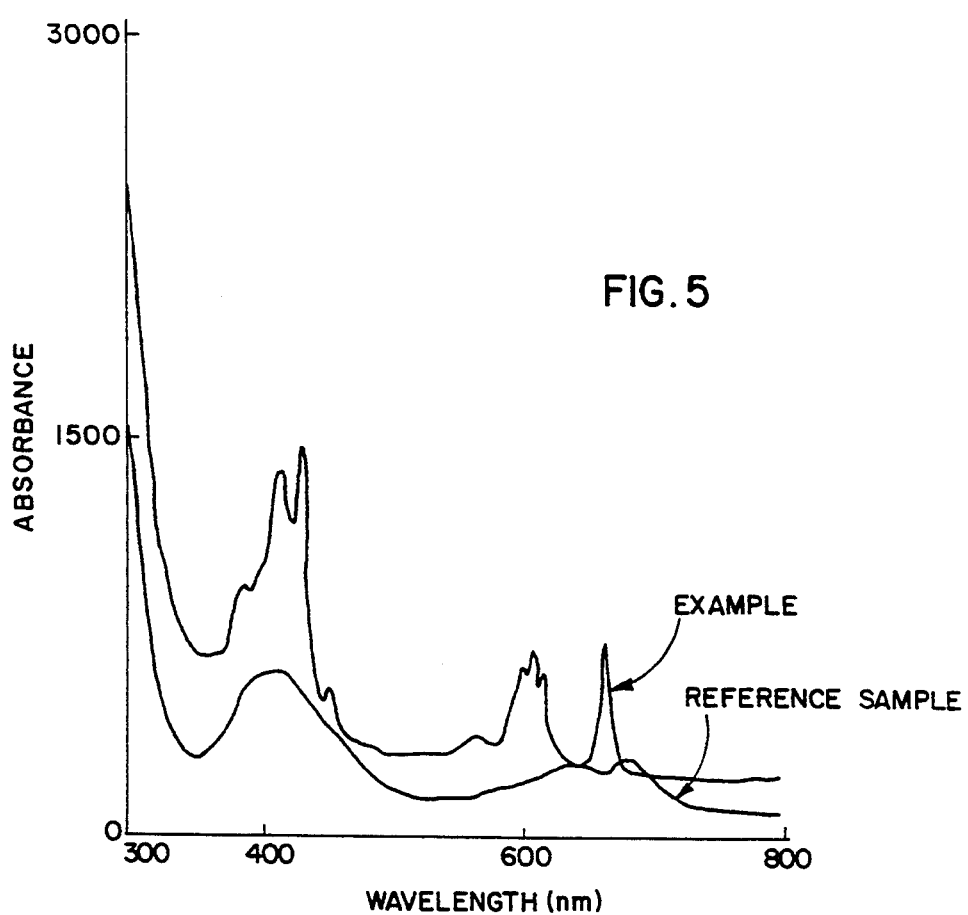
FIG. 5 is a graph of the visible light absorption spectra of a polymer composite of EXAMPLE 1 and an aggregated tetrabenzoporphyrin film of a reference material prepared by vapor deposition.

The polyamide composite containing tetrabenzoporphyrin dispersed therein and a reference sample of aggregated tetrabenzoporphyrin film prepared by vapor deposition, were examined for visible light absorption spectrum. In FIG. 5, the light absorption spectrum shows that the polyamide composite gave a number of clear absorption peaks that differ from the broad absorption peaks of the reference sample. This demonstrates that the tetrabenzoporphyrin molecules are dispersed on the molecular level in the polyamide composite and but not in the reference sample.

Each of the polyamide composites of this example and nylon 6, which was to be colored, were dissolved in m-cresol. The resultant solutions were each applied to a glass plate which was then placed in a degassing chamber and exposed to a reduced pressure applied by a rotary pump to produce a thin polymer composition sheet of colored nylon 6.

The polyamide composite and the nylon 6 were used in amounts provide a composition containing 0.5 wt % colorant.

The results of the observation of the color tone, uneven coloring anti colorant size are provided in TABLE I, below.

TABLE I

|  | EXAMPLE 1 | | | | COMPARATIVE EXAMPLE 1 | |
|---|---|---|---|---|---|---|
|  | A | B | C | D | A | B |
| colorant | CoTPP-Nylon[1] | VOTPP-Nylon[2] | CuPC-Nylon[3] | H$_2$TBP-Nylon[4] | CoTPP[5] | H$_2$TBP[6] |
| color tone | yellow | pink | blue | green | yellow | green |
| uneven coloring | no | no | no | no | yes | yes |
| colorant size | no aggregation, one molecule | no aggregation, one molecule | no aggregation, one molecule | no aggregation one molecule | aggregation 1~100 microns | aggregation 1~100 microns |

[1] polyamide composite containing cobalt tetraphenylporphyrin
[2] polyamide composite containing vanadyl tetraphenylporphyrin
[3] polyamide composite containing copper naphthalocyanine
[4] polyamide composite containing tetrabenzoporphyrin
[5] cobalt tetraphenylporphyrin
[6] tetrabenzoporphyrin

COMPARATIVE EXAMPLE 1

Conventionally Colored Nylon 6

COMPARATIVE EXAMPLES 1A and 1B were prepared by dissolving cobalt tetraphenylporphyrin and tetrabenzoporphyrin colorant, respectively, and nylon 6 in m-cresol to produce comparative solutions that were applied to glass plates. The glass plates were then placed in a degassing chamber and the solvent was removed to produce the conventionally colored nylons.

The conventionally colored nylon contained 0.5 wt % colorant.

The results of the observation of the color tone, uneven coloring and colorant size are shown in TABLE I.

EXAMPLE 2

Compositions Made Using Polycarbonate

The polyamide composites of EXAMPLE 1 were each dispersed in polycarbonate by dissolving the polyamide composite and polycarbonate in m-cresol to produce a solution that was applied to a glass plate. The glass plate was placed in a degassing chamber and the solvent was removed to yield a sheet of polymer composition.

The polyamide composite and the polycarbonate were used in amounts to yield a composition having 0.5 wt % colorant.

The results of the observation of the color tone, uneven coloring and colorant size are shown in TABLE II.

COMPARATIVE EXAMPLE 2

Conventionally Colored Polycarbonates

COMPARATIVE EXAMPLES 2A and 2B were prepared by dissolving cobalt tetraphenylporphyrin and tetrabenzoporphyrin colorant, respectively, and polycarbonate in m-cresol to produce comparative solutions that were applied to glass plates. The glass plates were then placed in a degassing chamber. The solvent was removed under reduced pressure to yield the conventionally colored polycarbonates.

The colorant and the polycarbonate were used in amounts to produce colored polycarbonate that contained 0.5 wt % colorant.

The results of the observation of the color tone, uneven coloring and colorant size are shown in TABLE II.

EXAMPLE 3

Compositions Made Using Polymethyl Methacrylate

The polyamide composites of EXAMPLE 1 were each mixed with polymethyl methacrylate by dissolving the polyamide composite and polymethyl methacrylate in m-cresol to produce a solution that was applied to a glass plate. The glass plate was placed in a degassing chamber and the solvent was removed to yield a sheet of polymer composition.

The polyamide composite and the polymethyl methacrylate were used in amounts to yield a composition having 0.5 wt % colorant.

TABLE II

| | EXAMPLE 2 | | | | COMPARATIVE EXAMPLE 2 | |
|---|---|---|---|---|---|---|
| | A | B | C | D | A | B |
| colorant | CoTPP-Nylon[1] | VOTPP-Nylon[2] | CuPC-Nylon[3] | H$_2$TBP-Nylon[4] | CoTPP[5] | H$_2$TBP[6] |
| color tone | yellow | pink | blue | green | yellow | green |
| uneven coloring | no | no | no | no | yes | yes |
| colorant size | no aggregation, one molecule | no aggregation, one molecule | no aggregation, one molecule | no aggregation, one molecule | aggregation 1~100 microns | aggregation 1~100 microns |

[1] polyamide composite containing cobalt tetraphenylporphyrin
[2] polyamide composite containing vanadyl tetraphenylporphyrin
[3] polyamide composite containing copper naphthalocyanine
[4] polyamide composite containing tetrabenzoporphyrin
[5] cobalt tetraphenylporphyrin
[6] tetrabenzoporphyrin The results of the observation of the color tone, uneven coloring and colorant size are shown in TABLE III.

TABLE III

| | EXAMPLE 1 | | | | COMPARATIVE EXAMPLE 1 | |
|---|---|---|---|---|---|---|
| | A | B | C | D | A | B |
| colorant | CoTPP-Nylon[1] | VOTPP-Nylon[2] | CuPC-Nylon[3] | H$_2$TBP-Nylon[4] | CoTPP[5] | H$_2$TBP[6] |
| color tone | yellow | pink | blue | green | yellow | green |
| uneven coloring | no | no | no | no | yes | yes |
| colorant size | no aggregation, one | no aggregation, one | no aggregation, one | no aggregation one | aggregation 1~100 microns | aggregation 1~100 microns |

TABLE III-continued

| | EXAMPLE 1 | | | COMPARATIVE EXAMPLE 1 | |
|---|---|---|---|---|---|
| A | B | C | D | A | B |
| molecule | molecule | molecule | molecule | | |

[1] polyamide composite containing cobalt tetraphenylporphyrin
[2] polyamide composite containing vanadyl tetraphenylporphyrin
[3] polyamide composite containing copper naphthalocyanine
[4] polyamide composite containing tetrabenzoporphyrin
[5] cobalt tetraphenylporphyrin
[6] tetrabenzoporphyrin

COMPARATIVE EXAMPLE 3

Conventionally Colored Polymethyl Methacrylate

COMPARATIVE EXAMPLES 3A and 3B were prepared by dissolving cobalt tetraphenylporphyrin and tetrabenzoporphyrin color, respectively, and polymethyl methacrylate in m-cresol to produce comparative solutions that were applied to glass plates. The glass plates were then placed in a degassing chamber. The solvent was removed under reduced pressure to yield the conventionally colored methyl methacrylates.

The colorant and the polymethyl methacrylate were used in amounts to produce a comparative sheet that contained 0.5 wt % colorant.

The results of the observation of the color tone, uneven coloring and colorant size are shown in TABLE III.

EXAMPLE 4

Polyamide Composite Containing 0.2 wt % Colorant and Composition Made Therefrom

A polyamide composite using tetraphenylporphyrin and nylon 11 was produced in accordance with the method described in EXAMPLE 1, above, but with the polyamide composite containing 0.2 wt % of tetraphenylporphyrin.

The polyamide composite was colorless, transparent and lacked the color of tetraphenylporphyrin which suggests that the tetraphenylporphyrin molecules are separately dispersed on a molecular level with no aggregation of tetraphenylporphyrin molecules.

Figure 6:
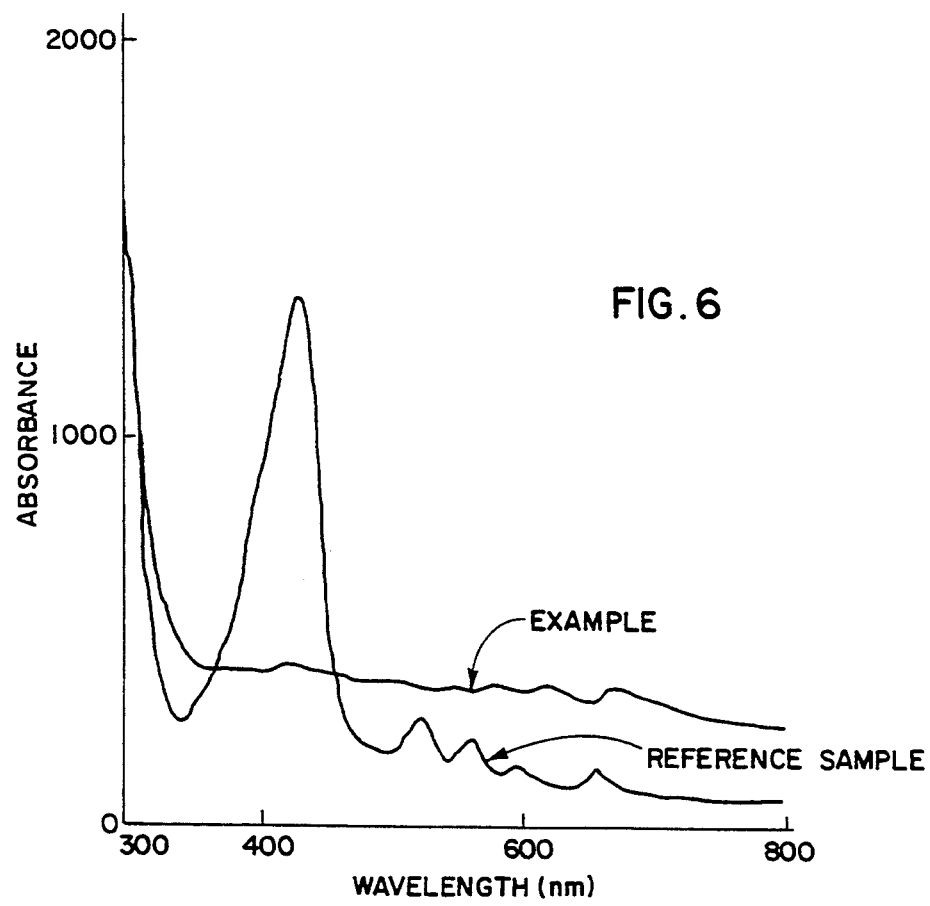
FIG. 6 is a graph of the visible light absorption spectra of a polymer composite of EXAMPLE 4 and an aggregated tetrabenzoporphyrin film of reference material prepared by vapor deposition.

As shown in FIG. 6, visible absorption spectrometry of the polyamide composite of this example gives no peaks and indicates that the polyamide composite is colorless and is transparent. But visible spectra of a vapor deposited tetraphenylporphyrin film of a reference sample reveals absorption peaks for tetraphenylporphyrin and that the film is not colorless.

Figure 7:
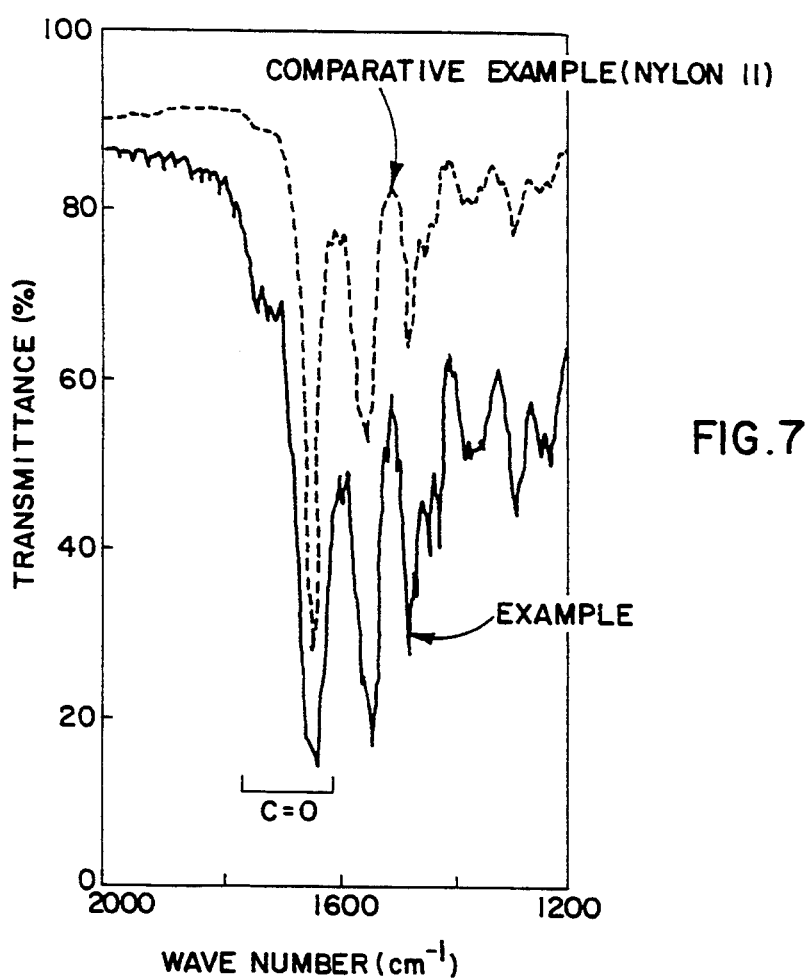
FIG. 7 is a graph of the Fourier transform infrared absorption spectra of the polymer composite of EXAMPLE 4 and a vapor-deposited polyamide film (nylon 11) of a reference material.

The Fourier transform infrared absorption spectrometry, shown in FIG. 7, of the polyamide composite reveals a broad absorption peak and a broad shoulder on the high frequency side for the carbonyl group of the polyamide which indicates that the carbonyl group is bound to the porphyrin. In contrast, the reference sample shows no broad peak and no broad shoulder on the high frequency side indicating that the carbonyl group is not bound to the porphyrin.

Figure 8:
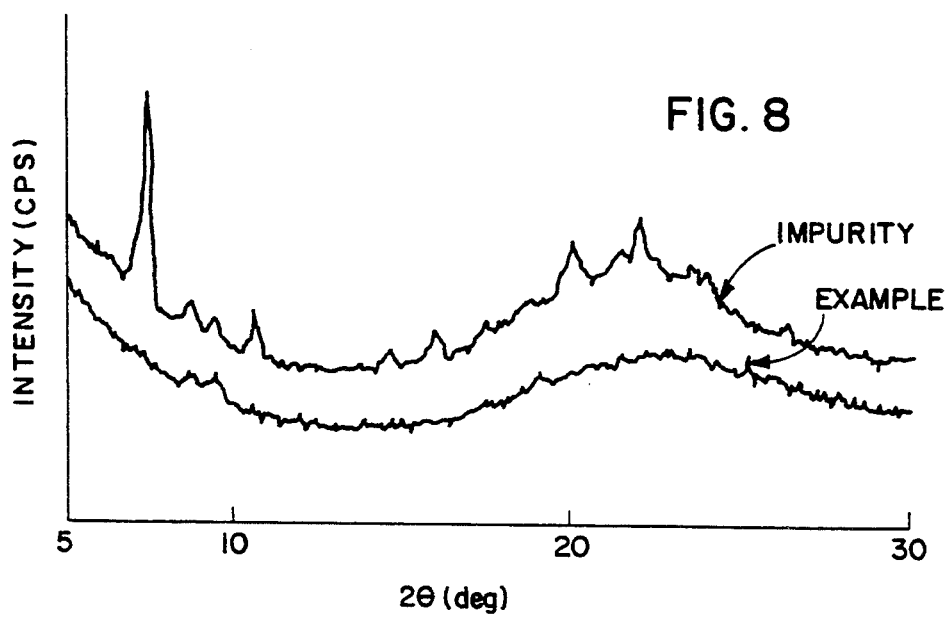
FIG. 8 is a graph of the x-ray diffraction patterns of the polymer composite of EXAMPLE 4 and impurities removed from the polyamide precursor.

The x-ray diffraction pattern (FIG. 8) of the polyamide composite reveals a noncrystalline halo which indicates that the porphyrin fails to crystallize. In contrast, the impurities removed from the polyamide composite showed the presence of crystalline porphyrin. This finding suggests that the purified polyamide composite contains porphyrin on a monomolecular basis because if the porphyrin is present as an aggregate there should be a crystalline domain due to the presence of a large number of polyamide molecules not in close contact with the porphyrin.

The polyamide composite and polymethyl methacrylate were dissolved in m-cresol and the resultant solution was applied to a glass plate. The glass plate was then placed in a degassing chamber and the solvent was removed under reduced pressure to produce a thin sheet of polymer composition.

The sheet was kept in an air tight container containing solvent vapor and the sheet was observed for color change. The solvents used and the test results are provided in TABLE IV. As indicated in TABLE IV, the sheet, originally colorless and transparent, changed its color according to the kind of vapor solvent to which is was exposed. Upon removal of the solvent vapor the sheet again became colorless and transparent. The material of COMPARATIVE EXAMPLE 4, described below, was yellow in color and this did not change when exposed to solvent.

TABLE IV

| | EXAMPLE 4 | | | | | COMPARATIVE EXAMPLE 4 |
|---|---|---|---|---|---|---|
| | A | B | C | D | E | A |
| solvent | m-cresol | toluene | p-xylene | cyclohexane | DMF[1] | m-cresol |
| original film | colorless and transparent | colorless and transparent | colorless and transparent | colorless and transparent | colorless and transparent | yellow and transparent |
| after 10 minutes in solvent vapor | yellow and transparent | pink and transparent | pink and transparent | pink and transparent | pink and transparent | yellow and transparent |

[1] DMP is dimethyl formamide.

COMPARATIVE EXAMPLE 4

Tetraphenylporphyrin-Containing Material

Tetraphenylporphyrin and polymethyl methacrylate were dissolved in m-cresol in mounts effective to provide 0.2 wt % colorant. The comparative solution was applied to a glass plate that was then placed in a degassing chamber. The solvent was removed under reduced pressure to produce a comparative sheet-form material. The material was yellow in color and transparent.

EXAMPLE 5

Polycarbonate Composite

Two polycarbonate metastable layers were produced in accordance with the procedure disclosed in EXAMPLE 1, above.

The polycarbonate layers were then coated with 4-nitro-4′-dimethylaminoazobenzene or 4-dimethylaminoazobenzene by placing the respective colorant on the tungsten board, heating the board and evaporating the colorant at a reduced pressure of $10^{-4}$ to $10^{-6}$ Torr to deposit a film of the colorant on the polycarbonate layer.

The colorant film coated polycarbonate layers were removed from the vacuum deposition apparatus and maintained in an oven at a temperature of 100° C., for a time period of ten minutes to produce polycarbonate composite precursors.

The polyamide composite precursors were immersed in carbon tetrachloride for a time period of five minutes, removed and then immersed in fresh carbon tetrachloride for a time period of five minutes. This cycle was repeated twice to remove poorly distributed aggregates of the colorant. The solvent was removed to produce solid polycarbonate composites.

Results of the observation of color tone, uneven coloring and colorant size are provided in TABLE V, below.

TABLE V

|  | EXAMPLE | | | | COMPARATIVE EXAMPLE | |
| --- | --- | --- | --- | --- | --- | --- |
|  | 5A | 5B | 6 | 7 | 5 | 6 |
| polymer | polycarbonate[1] | polycarbonate[2] | polystyrene[1] | polyethylene terephthalate[1] | polycarbonate[1] | polystyrene[1] |
| color tone | red | yellow | red | orange | dark red | dark red |
| uneven coloring | no | no | no | no | yes | yes |
| colorant size | no aggregation | no aggregation | no aggregation | no aggregation | aggregation 1~100 microns | aggregation 1~100 microns |

[1] 4-nitro-4′-dimethylaminoazobenzene
[2] 4-dimethylaminoazobenzene

Figure 9:
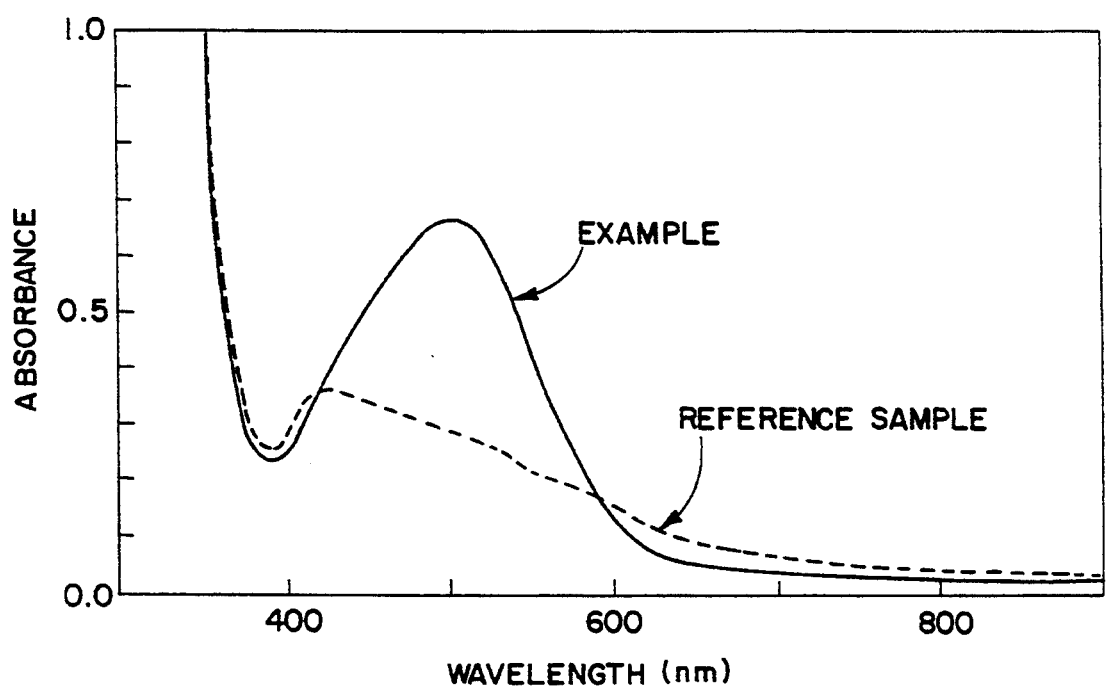
FIG. 9 is a graph of the visible light absorption spectra of a polycarbonate composite and an aggregated 4-nitro-4'-dimethylaminoazobenzene film of reference material prepared by vapor deposition.
Figure 10:
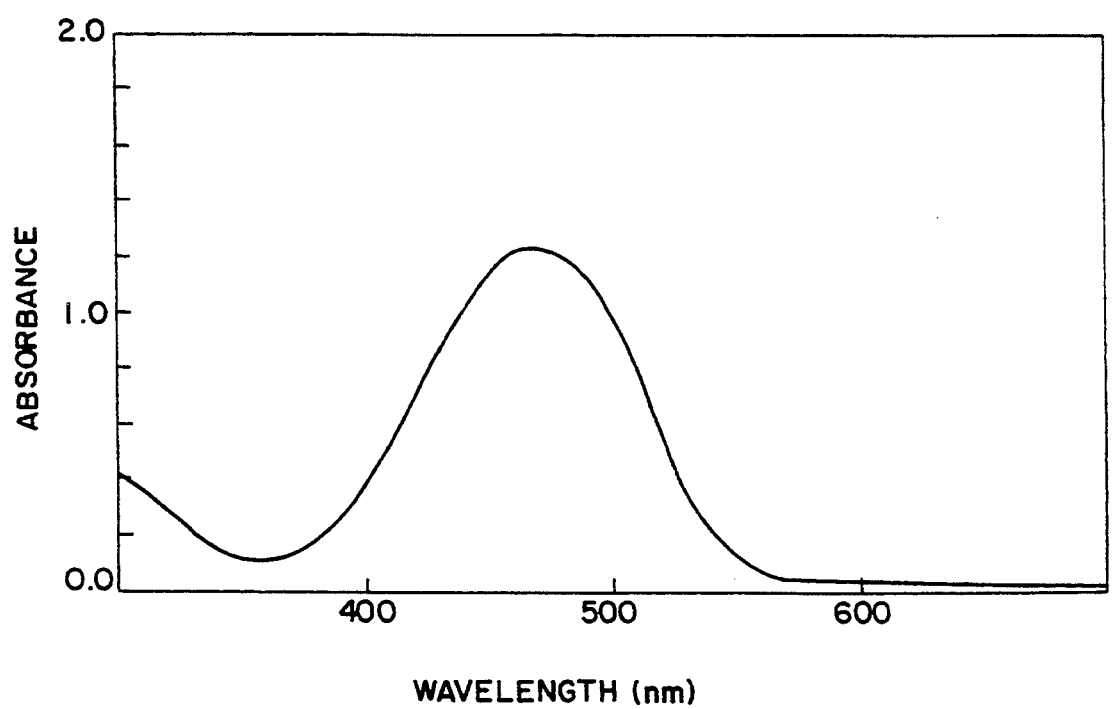
FIG. 10 is a graph of the visible light absorption spectrum for a 0.03 mol % solution of 4-nitro-4'-dimethylaminoazobenzene purified in benzene.

Visible light absorption spectra for the polycarbonate composite containing 4-nitro-4′-dimethylaminoazobenzene and a reference sample of a vapor deposited 4-nitro-4′-dimethylaminoazobenzene polycarbonate were taken. As can be seen in FIG. 9, the polycarbonate composite gave a single, clear absorption peak differing from the broad absorption spectrum of the comparative material. The spectrum for the polycarbonate is similar for a visible light absorption spectrum for a 0.03 mol % solution of 4-nitro-4′-dimethylaminoazobenzene purified in benzene shown in FIG. 10. This demonstrates that in the polycarbonate composite the colorant molecules have been dispersed in the polycarbonate on a molecular level forming a solid solution with polycarbonate.

COMPARATIVE EXAMPLE 5

Conventionally Colored Polycarbonate

Polycarbonate was conventionally colored by dissolving polycarbonate and 4-nitro-4′-dimethylaminoazobenzene in dichloromethane to produce a comparative solution. A portion of this comparative solution was placed on a glass plate, the glass plate was placed in a degassing chamber and the solvent was removed to produce the conventionally colored polycarbonate.

The colored polycarbonate contained 0.5 weight % colorant.

The results of the observation of color tone, uneven coloring and colorant size are shown in TABLE V.

EXAMPLE 6

Polystyrene Composite

A polystyrene composite was prepared according to the method described in EXAMPLE 5, above, using polystyrene and 4-nitro-4′-dimethylaminoazobenzene.

The polystyrene composite precursor was treated with tetrahydrofuran and centrifuged to separate and remove poorly distributed colorant and other impurities. A pure, solid polystyrene composite was produced.

The results of the observation of color tone, uneven coloring and colorant size are provided in TABLE V.

COMPARATIVE EXAMPLE 6

Conventionally Colored Polystyrene

Polystyrene was conventionally colored by dissolving polystyrene and 4-nitro-4′-dimethylaminoazobenzene in dichloromethane to produce a comparative solution. A portion of this comparative solution was placed on a glass plate, the glass plate was placed in a degassing chamber and the solvent was removed to produce the conventionally colored polystyrene.

The colored polystyrene contained 0.5 weight % colorant.

The results of the observation of color tone, uneven coloring and colorant size are shown in TABLE V.

EXAMPLE 7

Polyethylene Terephthalate

A polyethylene terephthalate composite precursor was prepared according to the method described in EXAMPLE 5, above, using polyethylene terephthalate and 4-nitro-4'-dimethylaminoazobenzene.

The polyethylene terephthalate composite precursor was treated with diphenyl ether and centrifuged to separate and remove poorly distributed colorant and other impurities. A pure, solid polyethylene terephthalate composite was produced.

The results of the observation of color tone, uneven coloring and colorant size are shown in TABLE V.

The polymer composite has colorant molecules dispersed therein with the colorant being in the polymer matrix or, as in the case when the polymer resin is a polyamide resin and the colorant has at least one N—H group or one metal group capable of bonding to the carbonyl group of the polyamide via a hydrogen or coordinate bond, bonding to the carbonyl group of the polyamide molecule. Crystallization of the polyamide is inhibited by the size and shape of the colorant. This inhibition of crystallization insures a separate dispersion of the colorant on a monomolecular level and a high colorant availability for the intended purpose of the polyamide composite. The polymer composition containing the colorless and transparent polymer composite can change its color upon exposure to solvent vapor yet become colorless and transparent upon removal of the solvent vapor. The polymer composition in sheet-form is well suited for use as a chemical indicator polymer.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

We claim:

1. A polymer composite suitable for use as at least one of a dye, coloring agent and chemical indicator polymer, the polymer composite comprising a polymer resin and at least one colorant capable of being dispersed on a molecular level without aggregates in the polymer resin, the colorant is caused to migrate into the polymer resin by relaxation of a thermodynamically metastable polymer resin layer having a film of the colorant thereon to a thermodynamically stable state to form a polymer precursor.

2. The polymer composite in accordance with claim 1 wherein the polymer resin is a polyamide.

3. The polymer composite in accordance with claim 1 wherein the polymer resin has a cohesive energy density of at least about 2,000 cal/mol.

4. The polymer composite in accordance with claim 1 wherein the polymer resin has a cohesive energy density in the range of about 2,000 to about 6,000 cal/mol.

5. The polymer composite in accordance with claim 1 wherein the colorant is selected from the group consisting of azobenzene, 4-phenylazobenzene, 4-dimethylaminoazobenzene, 4-dimethylamino-4'-methylazobenzene, 4-nitro-4'-dimethylaminoazobenzene, 1-phenylazonaphthalene, 4-phenylazoazobenzene, (naphthylazo)-1,1'-azonaphthalene, trisazobenzene, stilbene, 4-dimethylamino-4'-nitrostilbene, coumarin, 4-methyl-7-dimethylaminocoumarin, 3,3'-diethyldicarbocyanine iodide, 3,3'-methyloxatricarbocyanine iodide, 3-ethyl-5-[4-(3-ethyl-2-benzothiazolylidene)-2-hexenylidene]rhodanine, squarilium, spiropyran, fulgide, indigo, anthracene, perylene and 1,4-benzoquinone.

6. The polymer composite in accordance with claim 1 wherein the colorant is selected from the group of porphyrin derivatives, metallo-porphyrin derivatives, phthalocyanine derivatives, metallo-phthalocyanine derivatives, naphthalocyanine derivatives and metallonaphthalocyanine derivatives.

7. The polymer composite in accordance with claim 6 wherein the polymer resin is a polyamide resin.

8. The polymer composite in accordance with claim 7 wherein the colorant has at least one N—H group or metal group that is capable of bonding to a carbonyl group of the polyamide.

9. The polymer composite in accordance with claim 7 wherein the polyamide is in a noncrystalline state in the polymer composite.

10. The polymer composite in accordance with claim 1 wherein the colorant is selected from the group of porphyrin derivatives having the FORMULA I:

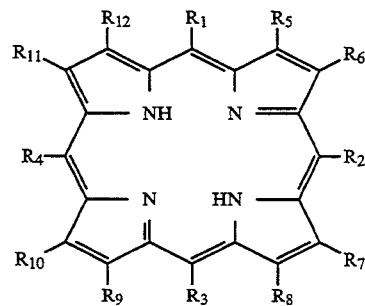

wherein R1, R2, R3 and R4 are alike or different and are hydrogen, an alkyl group, an alkoxy group, an amino group, a cyano group, a phenyl group, a benzo group or a pyridyl group and R5 to R12 are alike or different and are hydrogen, an alkyl group, an alkoxy group, an amino group or a cyano group, metallo-porphyrin derivatives having the FORMULA II:

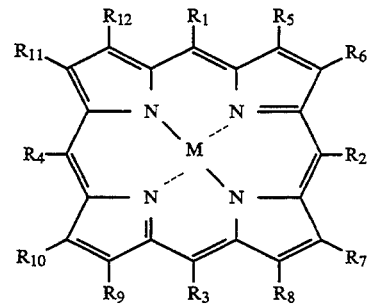

wherein R1 to R12 are as described above in connection with FORMULA I and M represents a transition metal, an alkali metal, an alkaline earth metal, an element belonging to the Group IIIA or IVA of the second or lower period or a metal belonging to Group VA or VIA of the Periodic Table, phthalocyanine derivatives having the FORMULA III:

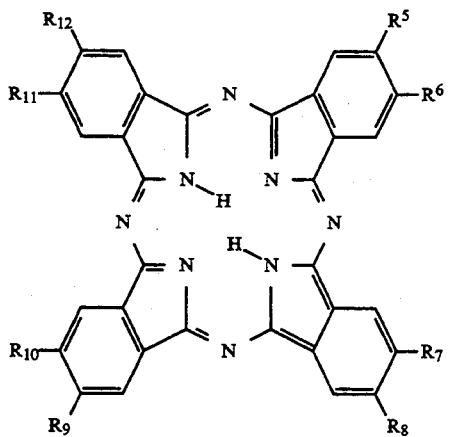

wherein R5 to R12 are as described above in connection with FORMULA I, metallo-phthalocyanine derivatives having the FORMULA IV:

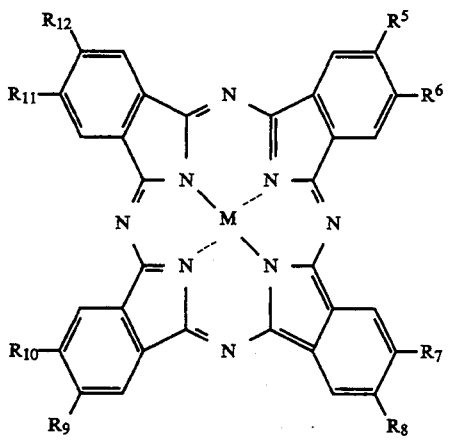

wherein R5 to R12 are as described above in connection with FORMULA I and M is as described in connection with FORMULA II, naphthalocyanine derivatives having the FORMULA V:

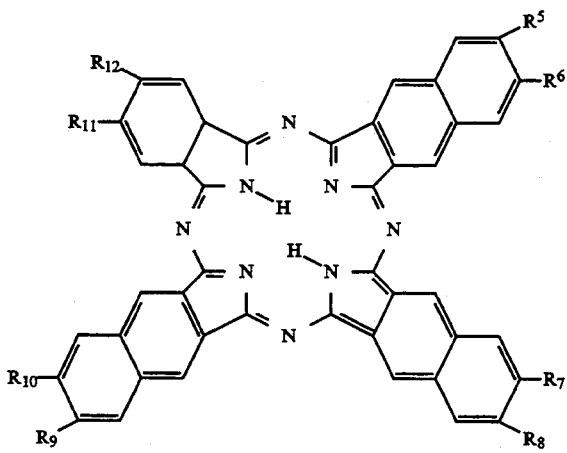

wherein R5 to R12 are as described above in connection with FORMULA I, and metallo-naphthalocyanine derivatives having the FORMULA VI:

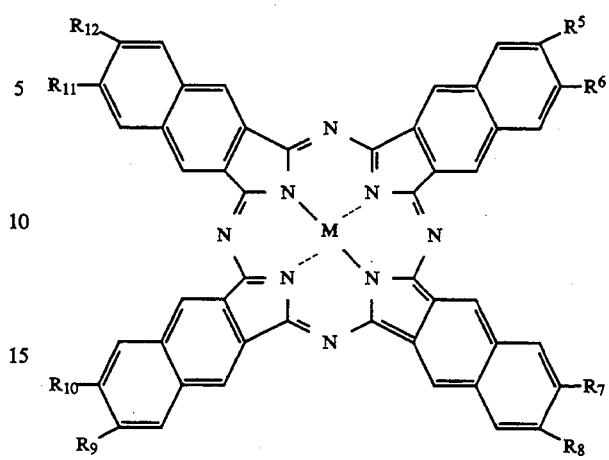

wherein R5 to R12 are as described above in connection with FORMULA I and M is as described in connection with FORMULA II.

11. The polymer composite in accordance with claim 1 wherein the colorant is present in an amount in the range of about 0.1 to about 30 weight percent based on the total weight of the composite.

12. A polymer composite suitable for use as at least one of a dye, coloring agent and chemical indicator polymer, the polymer composite comprising a polymer resin and at least one colorant selected from the group of porphyrin derivatives, metallo-porphyrin derivatives, phthalocyanine derivatives, metallo-phthalocyanine derivatives, naphthalocyanine derivatives, metallo-naphthalocyanine derivatives azobenzene, 4-phenylazobenzene, 4-dimethylaminoazobenzene, 4-dimethylamino-4'-methylazobenzene, 4-nitro-4'-dimethylaminoazobenzene, 1-phenylazonaphthalene, 4-phenylazoazobenzene, (naphthylazo)-1,1'-azonaphthalene, trisazobenzene, stilbene, 4-dimethylamino-4'-nitrostilbene, coumarin, 4-methyl-7-dimethylaminocoumarin, 3,3'-diethyldicarbocyanine iodide, 3,3'--methyloxatricarbocyanine iodide, 3-ethyl-5-[4-(3-ethyl-2-benzothiazolylidene)-2-hexenylidene]rhodanine, squarilium, spiropyran, fulgide, indigo, anthracene, perylene and 1,4-benzoquinone dispersed without aggregates in the polymer resin by migration of a film of the colorant on a thermodynamically metastable polymer resin layer into the polymer resin layer by relaxation to a thermodynamically stable state to form a polymer precursor.

13. The polymer composite in accordance with claim 12 wherein the polymer resin has a cohesive energy density of at least about 2,000 cal/mol.

14. The polymer composite in accordance with claim 12 wherein the polymer resin has a cohesive energy density in the range of about 2,000 to about 6,000 cal/mol.

15. The polymer composite in accordance with claim 12 wherein the colorant is present in an amount in the range of about 0.1 to about 30 weight percent based on the total weight of the composite.

16. The polymer composite in accordance with claim 12 wherein the colorant is selected from the group of porphyrin derivatives having the FORMULA I:

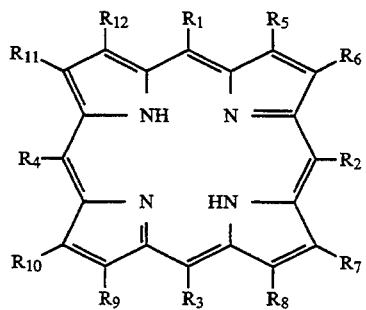

wherein R1, R2, R3 and R4 are alike or different and are hydrogen, an alkyl group, an alkoxy group, an amino group, a cyano group, a phenyl group, a benzo group or a pyridyl group and R5 to R12 are alike or different and can be hydrogen, an alkyl group, an alkoxy group, an amino group or a cyano group, metalloporphyrin derivatives having the FORMULA II:

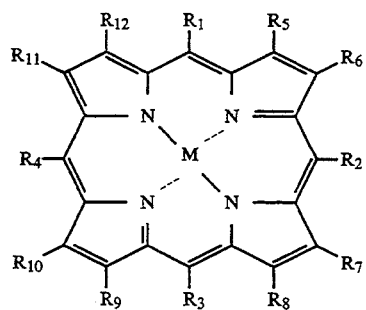

wherein R1 to R12 are as described above in connection with FORMULA I and M represents a transition metal, an alkali metal, an alkaline earth metal, an element belonging to the Group IIIA or IVA of the second or lower period or a metal belonging to Group VA or VIA of the Periodic Table, phthalocyanine derivatives having the FORMULA III:

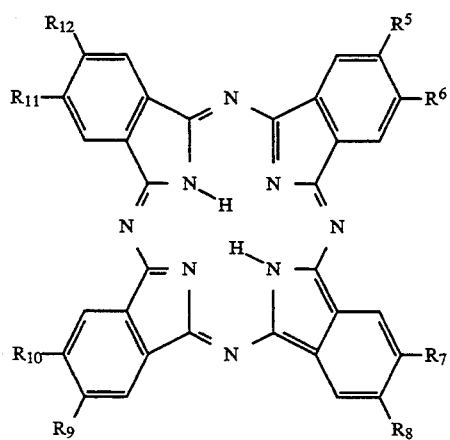

wherein R5 to R12 are as described above in connection with FORMULA I, metallo-phthalocyanine derivatives having the FORMULA IV:

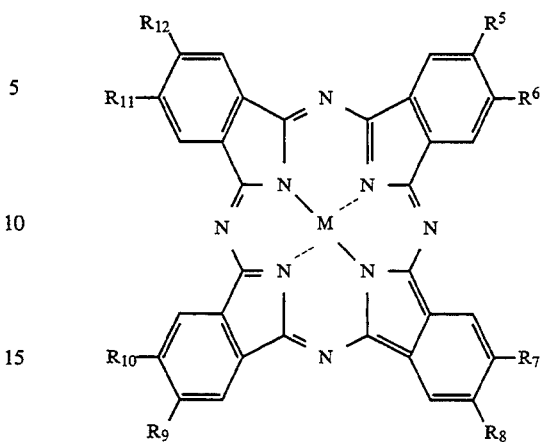

wherein R5 to R12 are as described above in connection with FORMULA I and M is as described in connection with FORMULA II, naphthalocyanine derivatives having the FORMULA V:

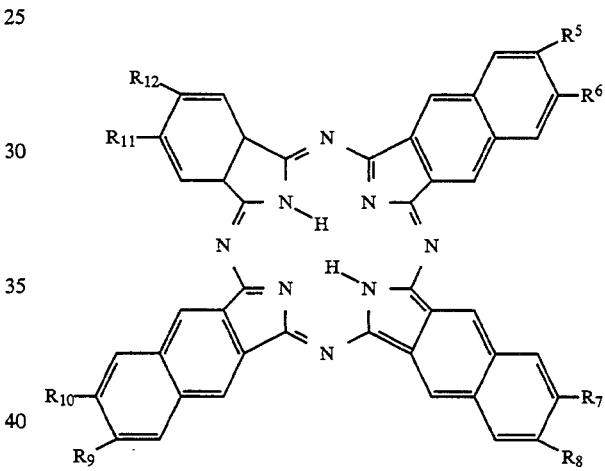

wherein R5 to R12 are as described above in connection with FORMULA I, and metallo-naphthalocyanine derivatives having the FORMULA VI:

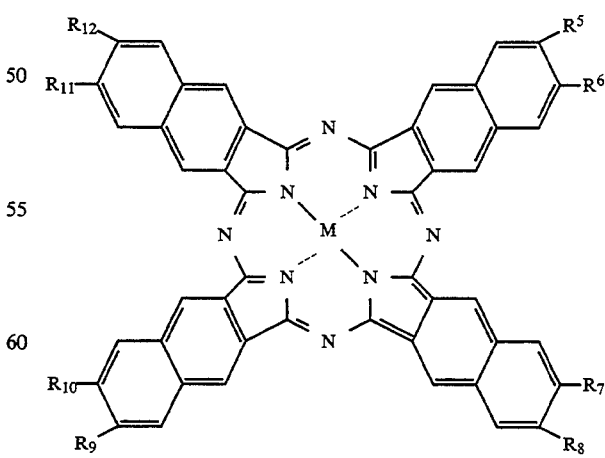

wherein R5 to R12 are as described above in connection with FORMULA I and M is as described in connection with FORMULA II.

17. The polymer composite in accordance with claim 12 wherein the polymer resin is a polyamide resin and the polyamide is in a noncrystalline state in the polymer composite.

18. The polymer composite of claim 1 wherein the polymer precursor is dissolved by exposure to solvent to form a solution.

19. The polymer composite of claim 18 wherein the solution is filtered to form a filtrate and the filtrate is dried to form a polymer composite.

20. A polymer composite suitable for use as at least one of a dye, coloring agent and chemical indicator polymer, the polymer composite comprising a polymer resin and at least one colorant dispersed in the polymer resin by the migration of the colorant into a thermodynamically metastable polymer resin layer from a film of the colorant thereon by relaxation to a thermodynamically stable state to form a polymer precursor, dissolution of the precursor in a solvent to form a solution, filtration of the solution to form a filtrate and solidification the filtrate to form a substantially aggregate free polymer composite.

21. A polymer composite suitable for use as at least one of a dye, coloring agent and chemical indicator polymer, the polymer composite comprising a polymer resin and at least one colorant capable of being dispersed on a molecular level without aggregates in the polymer resin by:
 depositing a thermodynamically metastable polymer resin layer;
 depositing a film of the at least one colorant onto the metastable layer;
 relaxing the polymer layer to cause migration of the colorant into the polymer layer to disperse the colorant in the polymer layer; and
 removing aggregates or impurities from the polymer resin layer having colorant dispersed therein using a solvent.

22. The polymer composite of claim 21 wherein the aggregates or impurities are removed by:
 dissolving the polymer resin layer having colorant dispersed therein in a solvent;
 centrifuging the solution to remove colorant aggregates; and removing the solvent.

* * * * *